United States Patent [19]

Cummings et al.

[11] 4,245,147
[45] Jan. 13, 1981

[54] VAPOR TRANSFER GRIDDLE WITH IMMERSED ELECTRICAL HEATING

[75] Inventors: Gilbert A. Cummings, Gloucester, Mass.; Richard W. Hatch, Jr., Henniker, N.H.

[73] Assignee: Peters & Company, Inc., Dorchester, Mass.

[21] Appl. No.: 8,349
[22] Filed: Feb. 1, 1979

Related U.S. Application Data

[63] Continuation-in-part of Ser. No. 954,650, Oct. 25, 1978, abandoned, which is a continuation of Ser. No. 614,901, Sep. 19, 1975, abandoned.

[51] Int. Cl.³ .......................... A47J 37/06; H05B 3/68
[52] U.S. Cl. ....................................... 219/462; 99/331; 99/419; 126/387; 126/390; 126/378; 165/103; 165/105; 219/459; 219/530; 219/540; 432/91
[58] Field of Search .............. 219/430, 439, 462, 530, 219/540, 399, 325, 326; 126/377, 378, 390; 165/105; 99/422–425; 432/91

[56] References Cited

U.S. PATENT DOCUMENTS

| | | | |
|---|---|---|---|
| 1,154,993 | 9/1915 | Kercher | 219/439 |
| 1,226,696 | 5/1917 | Ramseur | |
| 1,698,596 | 1/1929 | Hynes | 219/315 |
| 2,236,837 | 4/1941 | Rimmel | |
| 2,279,000 | 4/1942 | Larson | |
| 2,434,016 | 1/1948 | Shields | |
| 2,547,402 | 4/1951 | Lucas et al. | 165/103 |
| 2,595,527 | 5/1952 | Kells et al. | 126/378 |
| 2,793,218 | 3/1956 | Wennerlund | 165/105 |
| 2,969,452 | 1/1961 | Geller et al. | |
| 3,020,383 | 2/1962 | Onishi et al. | 219/469 |
| 3,038,058 | 6/1962 | Gordon | |
| 3,301,170 | 1/1967 | Beasley | 99/331 |
| 3,306,010 | 2/1967 | Garofalow | 55/263 |
| 3,317,709 | 5/1967 | Beasley | 219/449 |
| 3,327,772 | 6/1967 | Kodaira | 165/32 |
| 3,379,118 | 4/1968 | Perez | 99/419 |
| 3,493,723 | 2/1970 | Popiel | 219/288 |
| 3,603,767 | 9/1971 | Scicchitano | 219/439 |
| 3,791,372 | 2/1974 | Hatsopoulos et al. | 126/390 |
| 3,815,575 | 6/1974 | Danis | 126/390 |
| 3,823,307 | 7/1974 | Weiss | 219/439 |
| 3,853,112 | 10/1974 | Lazaridis et al. | 165/105 |
| 3,948,244 | 4/1976 | Lazaridis et al. | 126/273.5 |
| 3,968,787 | 7/1976 | Basiulis | 126/390 |
| 3,985,120 | 10/1976 | Lazaridis et al. | 126/387 |

FOREIGN PATENT DOCUMENTS 529997 12/1921 France.
258804 12/1948 Switzerland.

OTHER PUBLICATIONS

Stainless Steel Griddle Utilizing Heat Pipe Vapor Chamber Design, Basiulis, Amer. Soc. of Mech. Engineers, 1973.
Thermo Electron Griddle Brochure.
The Isothermal Griddle, Industrial Research (New Product Annual), 1972.

*Primary Examiner*—Thomas J. Kozma
*Assistant Examiner*—Bernard Roskoski

[57] ABSTRACT

A vapor transfer griddle unit with a planar sheet metal heat conductive top member defining a horizontally extensive griddle, a bottom wall sealed to the top member and defining therewith a corresponding vapor chamber disposed below the griddle, a body of vaporizable heat transfer medium in liquid state partially filling the chamber with a vapor space between the surface of the liquid and the griddle at rest as well as over the range of griddling temperatures, a horizontally extensive electric heating array comprised of horizontally spaced electric heater tube portions extending directly beneath and spaced below the griddle and located above the bottom wall, and a set of griddle supports mutually arrayed with the heater tube portions and extending between and engaging the griddle and the bottom wall to provide a pattern of support across the underside of the griddle to maintain the griddle flat over its range of operation, the supports having openings permitting free self-leveling flow of liquid as well as free flow of vapor in the chamber, the body of liquid fully immersing the array of heater tubes throughout the range of griddling temperatures and comprising liquid which boils under vacuum conditions over the range, the chamber being permanently evacuated to a level sufficient to enable the liquid to so boil and the heater tube portions being heated by electrical resistance elements disposed there within with associated controls to selectively heat the liquid to boil at any desired temperature in the range.

7 Claims, 19 Drawing Figures

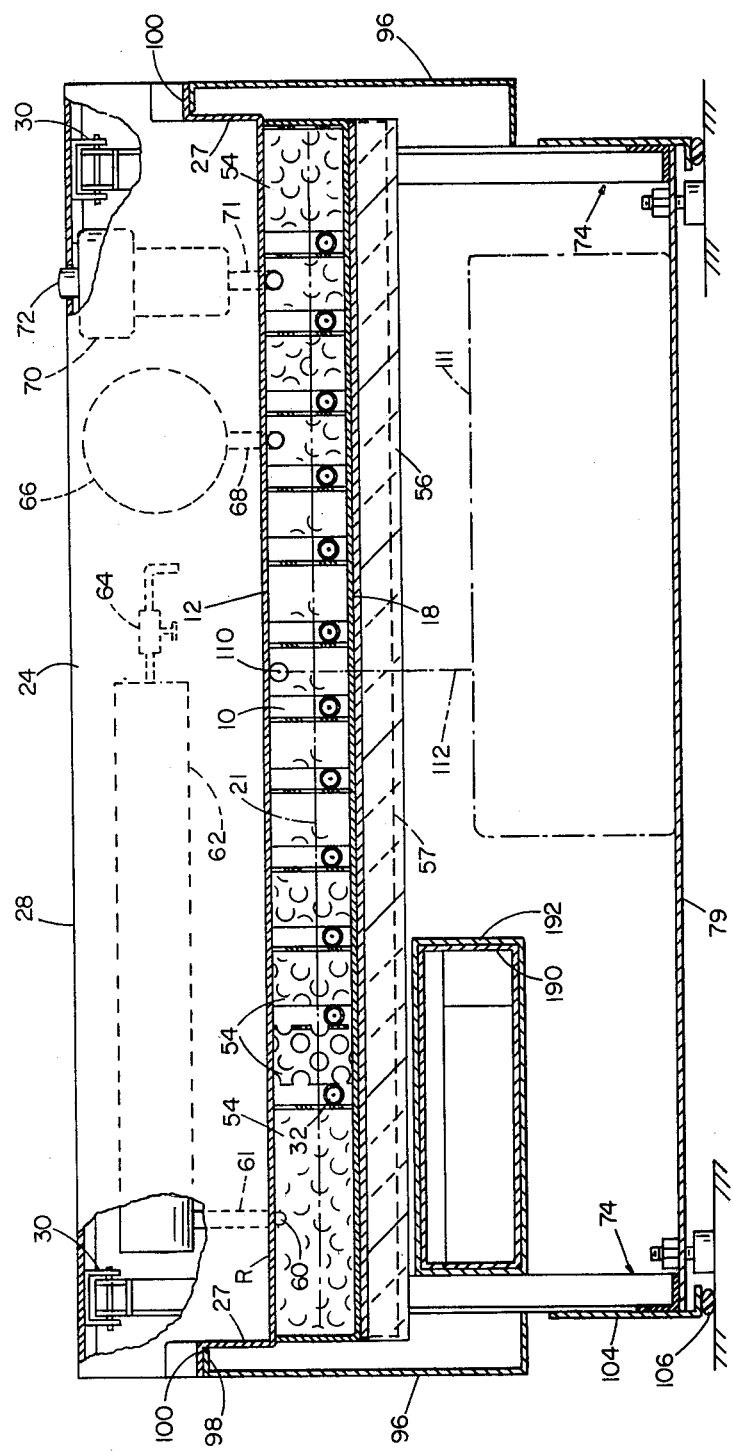

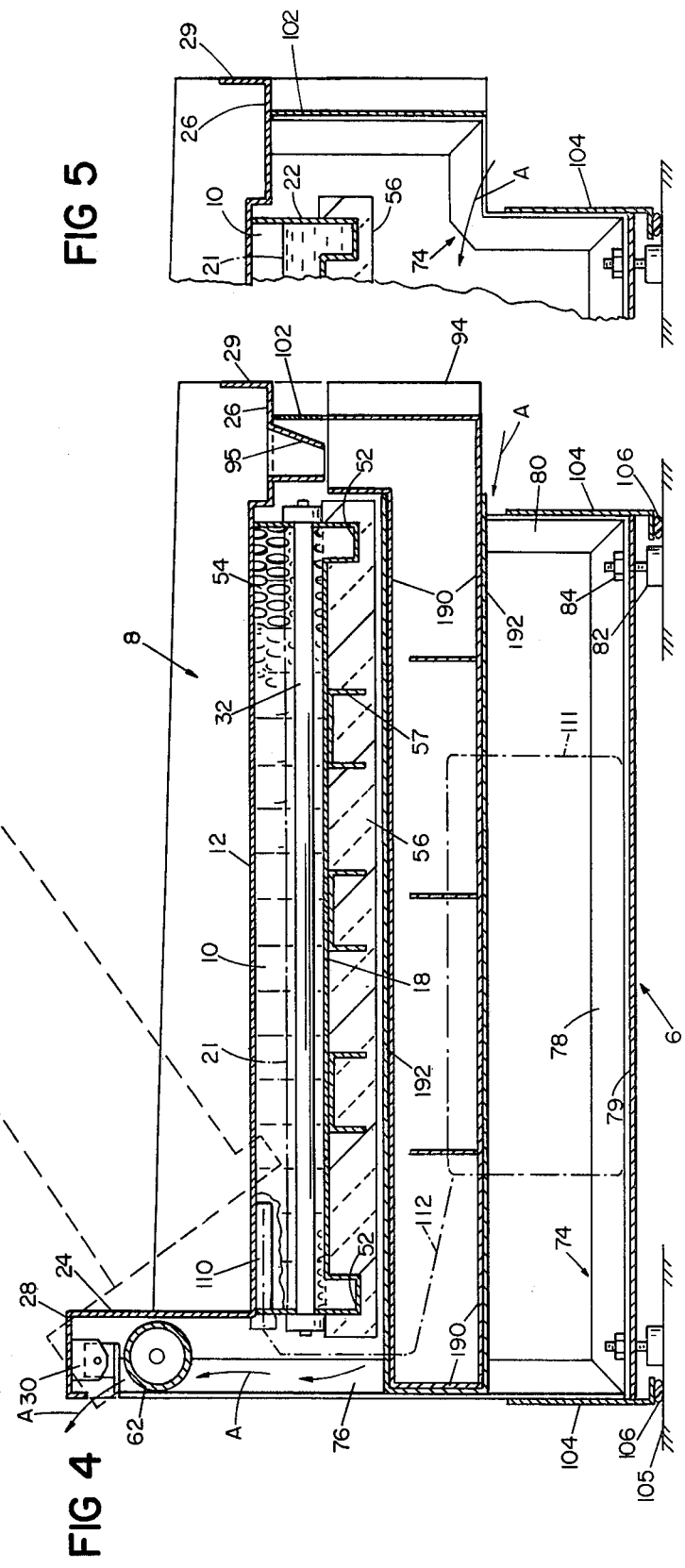

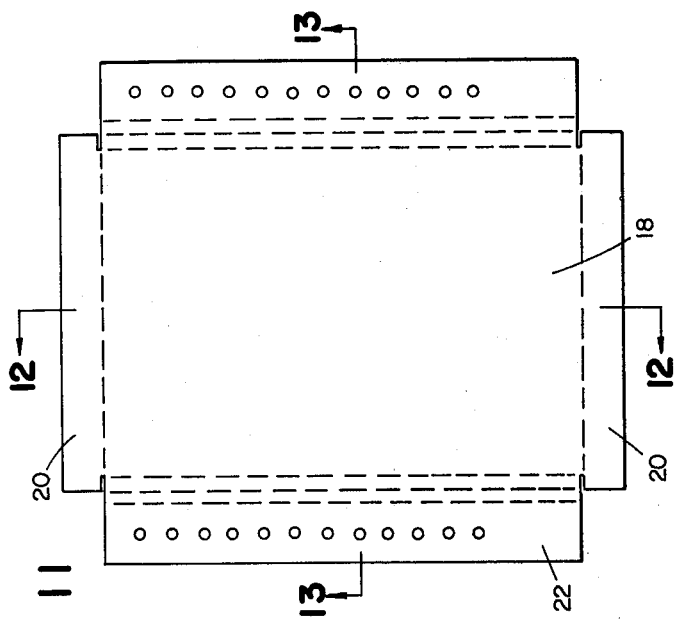
FIG 11
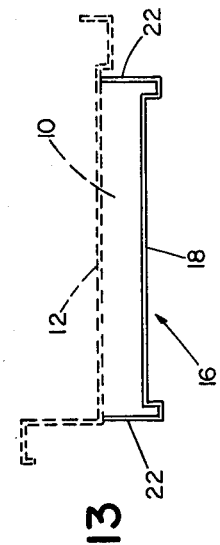
FIG 13
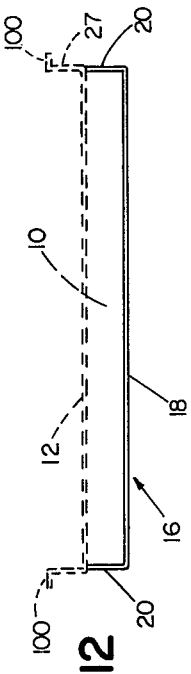
FIG 12
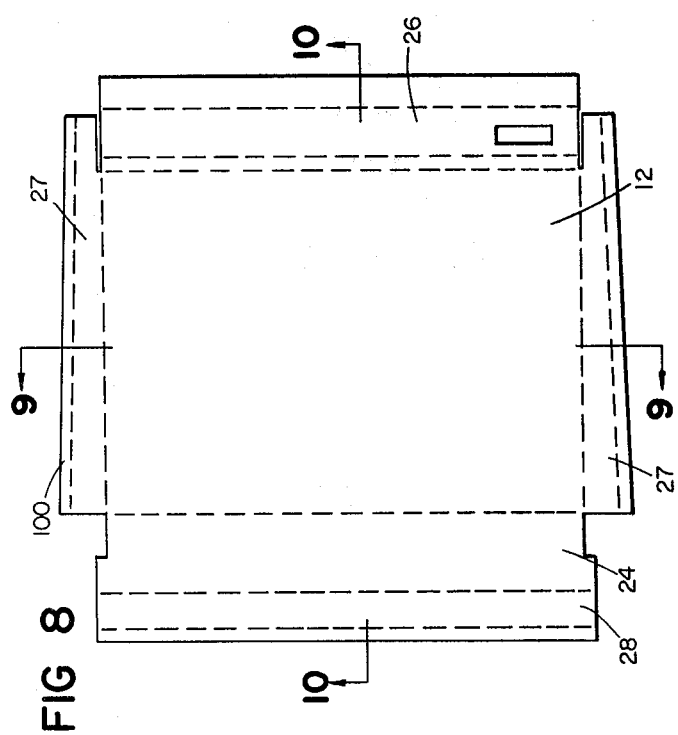
FIG 8
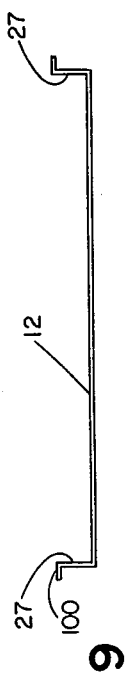
FIG 10
FIG 9

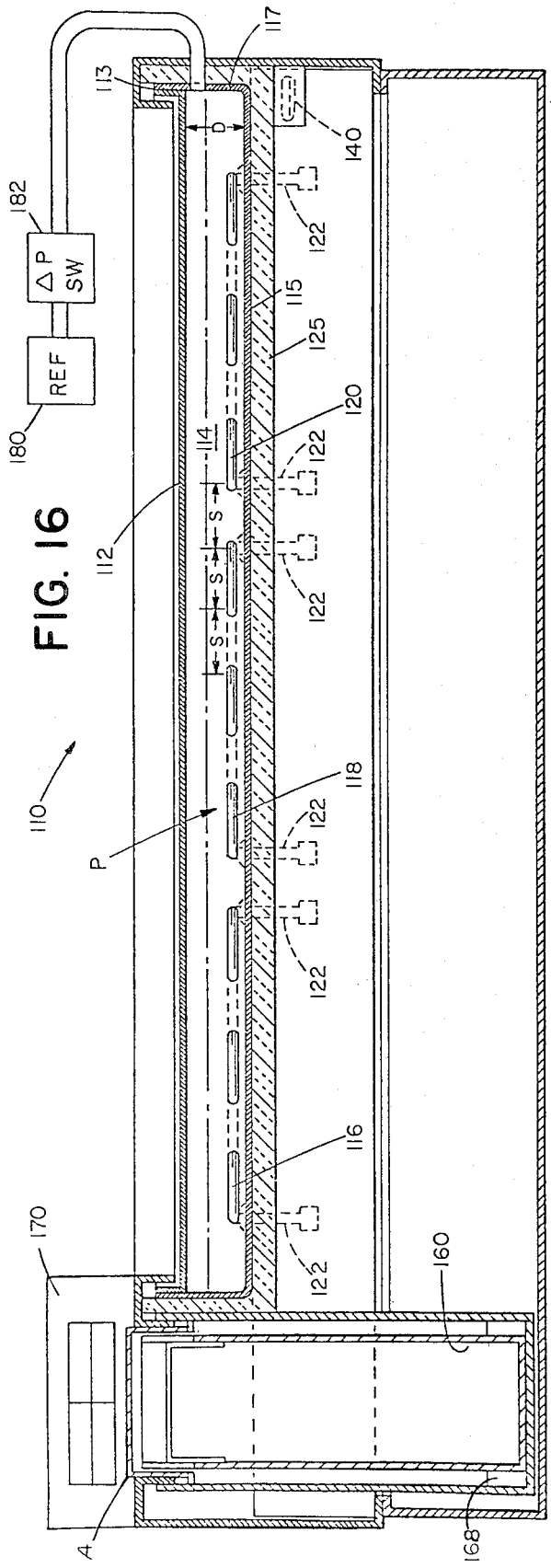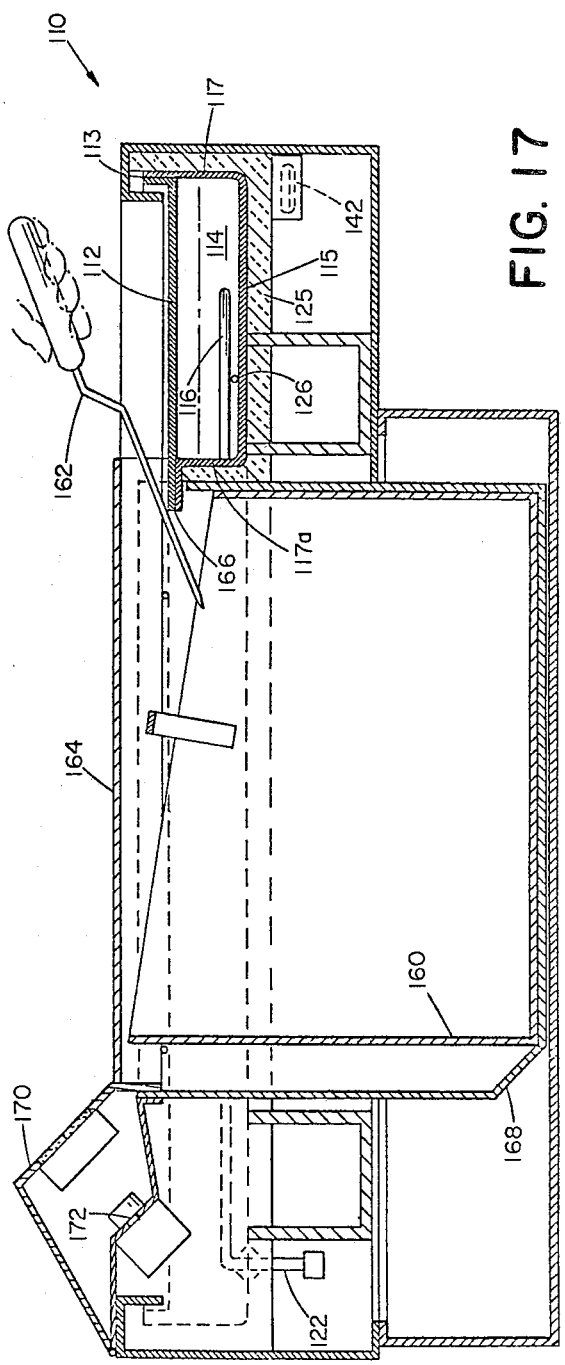

VAPOR TRANSFER GRIDDLE WITH IMMERSED ELECTRICAL HEATING

This application is a continuation in part of Ser. No. 954,650, filed Oct. 25, 1978, now abandoned which is a continuation of Ser. No. 614,901, filed Sept. 19, 1975, now abandoned.

FIELD OF THE INVENTION

This invention relates to commercial griddles and similar high performance cooking devices.

BACKGROUND OF THE INVENTION

Commercial griddles have a number of special requirements that distinguish them from other cooking units. A large flat cooking surface is required, capable of being scraped clean after frying of food; the cooking surface must be capable of delivering a high density heat flux variously over its area at a well-controlled temperature as high as 400° F. (204° C.); and the surface must retain its flatness over the wide range of thermal stresses that such variable loading implies. Desirable beyond this is a griddle that has no unevenly hot areas and one that is efficient in use of energy.

Griddles available today are constructed, as they have been for many decades, in the form of an extremely thick and heavy flat plate, heated from below by gas burners or electric elements. These require a long warm-up time and give uneven heating over the griddle surface. For these and other reasons they require an experienced operator and are wasteful of energy. Further, their uneven heating makes impracticable cooking "by the clock" a single product (e.g., hamburgers) over the entire griddle surface, as is strongly desired in fast-food restaurants.

It has been known for a long time that cooking surfaces can in principle be heated by vapor transfer techniques to achieve a uniform temperature. Examples are Swiss Pat. No. 258,804; French Pat. No. 529,997; and U.S. Pat. Nos. 2,279,000; 2,434,016; 2,595,527 and 3,823,307. But these proposals have not contributed an effective griddle.

With the advent of the heat pipe technology has come an attempt to apply the specialized heat pipe mode of vapor transfer heating to griddles using a localized heat source to which the transfer liquid is wicked by suitable wicking members. Examples are U.S. Pat. Nos. 3,853,112 and 3,968,787 and see also U.S. Pat. No. 3,603,767 and 3,791,372. These have failed to satisfactorily solve the complex set of problems that the high performance griddle imposes, as a result have not gone into commercial use, and in any event have serious drawbacks.

SUMMARY OF THE INVENTION

We have discovered a practical means of heating a griddle surface using vapor transfer techniques. Our invention offers for the first time a vapor-transfer griddle that is sufficiently rugged and reliable to withstand the rigorous operating conditions imposed by restaurant and other commercial cooking applications.

In one aspect, the griddle unit of our invention features a planar sheet metal heat conductive top member defining a horizontally extensive griddle, a bottom wall sealed to the top member and defining therewith a corresponding vapor chamber disposed below the griddle, a body of vaporizable heat transfer medium in liquid state partially filling the chamber with a vapor space between the surface of the liquid and the griddle at rest as well as over the range of griddling temperatures, a horizontally extensive electric heating array comprised of horizontally spaced electric heater tube portions extending directly beneath and spaced below the griddle and located above the bottom wall, and a set of griddle supports mutually arrayed with the heater tube portions and extending between and engaging the griddle and the bottom wall to provide a pattern of support across the underside of the griddle to maintain the griddle flat over its range of operation, the supports having openings permitting free self-leveling flow of liquid as well as free flow of vapor in the chamber, the body of liquid fully immersing the array of heater tubes throughout the range of griddling temperatures and comprising liquid which boils under vacuum conditions over the range, the chamber being permanently evacuated to a level sufficient to enable the liquid to so boil and the heater tube portions being heated by electrical resistance elements disposed there within with associated controls to selectively heat the liquid to boil at any desired temperature in the range. The sheet metal griddle is maintained flat for griddling, and vapor can be rapidly generated to heat the griddle to any selected griddling temperature in an energy-efficient manner.

In preferred embodiments, the exterior heating surface of the tube portions which receives heat from the electrical resistance elements and transfers the heat to the liquid comprises an aggregate heat transfer area greater than one half of the griddle cooking area. The array of heater tube portions comprises a set of straight, parallel horizontally spaced apart portions, each extending in length substantially throughout one horizontal dimension of the cooking surface, and the set of griddle surface supports is interfitted in the spaces between the heater tube portion to provide the pattern of support coextensively with the extent of the array of heater tube portions. The spacing between the axes of adjacent heater tube portions is less than about five times the diameter of the heater tube portions. The heater tube portions are spaced above the bottom wall of the chamber, the space below the heater tube portions being open to allow liquid to enter therebelow to be heated and vaporized. The chamber has a depth between about 1½ and 2 inches, and a width and length between two and three feet, about half of the depth of the chamber being filled with heat transfer liquid.

In a second aspect, the griddle of our invention features means defining a horizontally extensive electrically heated vaporizing surface, the surface being substantially coextensive with the griddle, the body of liquid fully immersing the vaporizing surface throughout the range of griddling temperatures and comprising liquid which boils under vacuum conditions over the range, and the vaporizing surface being heated by electrical resistance elements therewith, with associated controls to selectively heat the liquid to boil at any desired temperature in the range, at a heat transfer watt density from the vaporizing surface of the order of 30 watts per square inch of surface.

PREFERRED EMBODIMENTS

The structure, manufacture, and operation of preferred embodiments of the invention will now be described, after first briefly describing the drawings.

Drawings

FIG. 3 is a vertical cross-sectional view at 3—3 of FIG. 2, with portions of the back panel broken away.

FIG. 4 is a vertical cross-sectional view at 4—4 of FIG. 2, showing in broken lines the tilted upward position of the sealed chamber.

FIG. 5 is a side view of the forward supporting structure for the chamber.

FIG. 8 is a plan view of the sheet metal (with bending lines) for making the top half of the sealed chamber.

FIG. 9 is a cross-sectional profile (after bending) at 9—9 of FIG. 8.

FIG. 10 is a cross-sectional profile (after bending) at 10—10 of FIG. 8.

FIG. 11 is a plan view of the sheet metal (with bending lines) for making the bottom half of the sealed chamber.

FIGS. 12 and 13 are cross-sectional profiles (after bending) at 12—12 and 13—13 of FIG. 11, showing (in broken lines) the top half of the sealed chamber.

FIG. 16 is a longitudinal, vertical cross-section taken on line 16—16 of FIG. 15.

FIG. 17 is a transverse, vertical cross-section taken on line 17—17 of FIG. 15.

Most Preferred Embodiment

Figure 1:
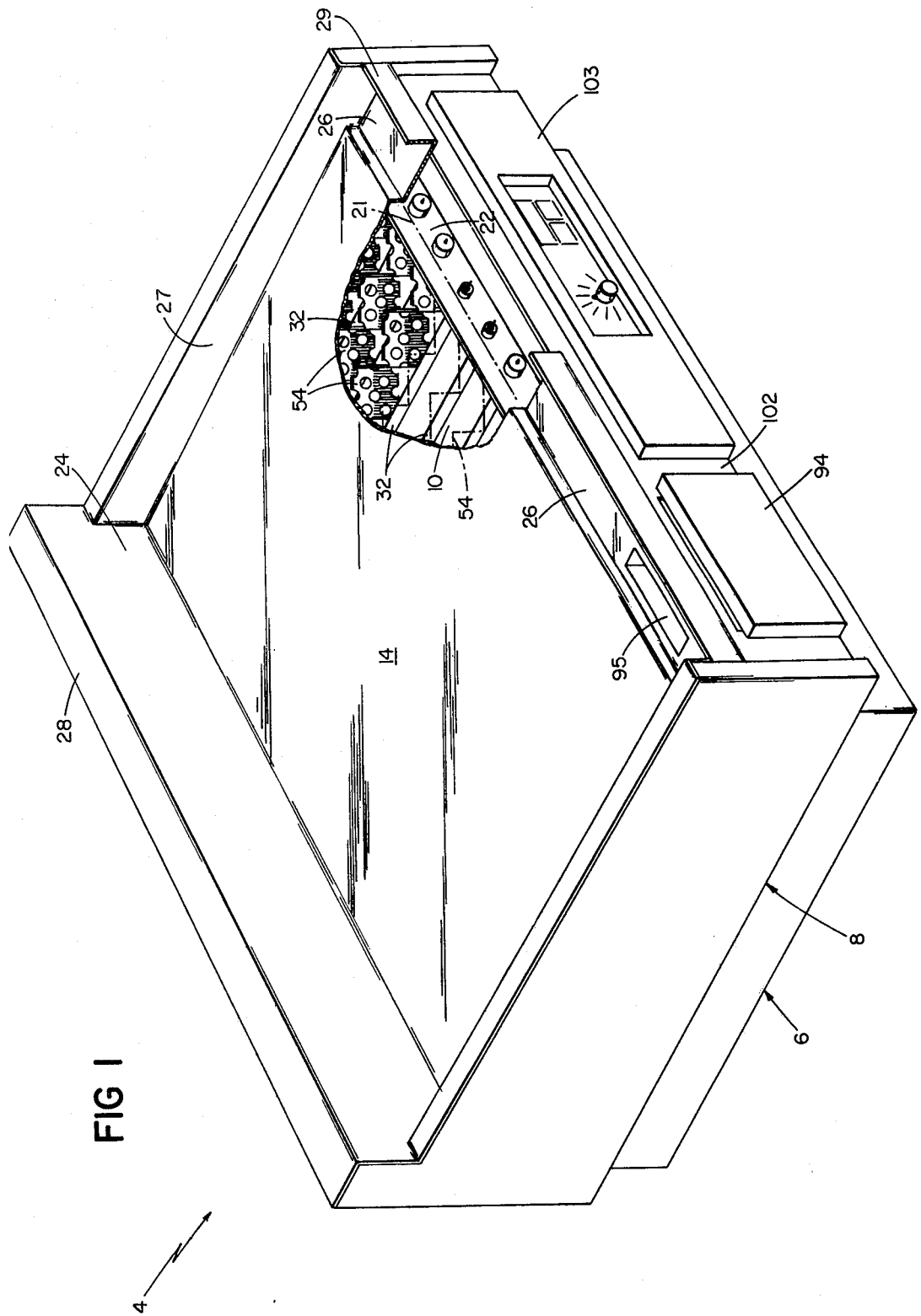
FIG. 1 is a perspective view of the presently most preferred embodiment, with a portion of the griddle surface broken away to expose the interior of the sealed vapor chamber. (The level of heat transfer liquid 21 is indicated by vertical shading.)

Referring to FIG. 1, there is shown a commercial size griddle with a cooking unit 8 supported on base 6. Cooking is done on griddle surface 14 (about 23 by 34 inches).

Referring to FIGS. 8 through 13, it can be seen that the exterior of the cooking unit 8 is made from two pieces of sheet metal. The top piece includes rectangular griddle panel 12 (12 gauge, i.e. 0.105 inch, 300 series stainless steel) and is welded at the periphery of panel 12 to the lower piece which is bent into the form of a shallow sheet metal box 16. Box 16 (16 gauge, i.e. 0.059 inch, 300 series stainless steel) consists of bottom panel 18 and integral sides 20, 22 (FIG. 11—13) and is about 2 inches deep.

Together, box 16 and griddle panel 12 form sealed vapor chamber 10. Griddle panel 12 is integral with back panel 24, forward grease-collecting trough 26, and sides 27, whose upper edges slope upwardly toward the back of the unit. Trough 26 has front edge 29 for scraping utensils and cracking eggs. Back panel 24 has horizontal top portion 28. Brackets 30 fastened to top portion 28 provide hinges for rotation of the entire cooking unit 8 upward from base 6 (broken lines in FIG. 4).

Figure 2:
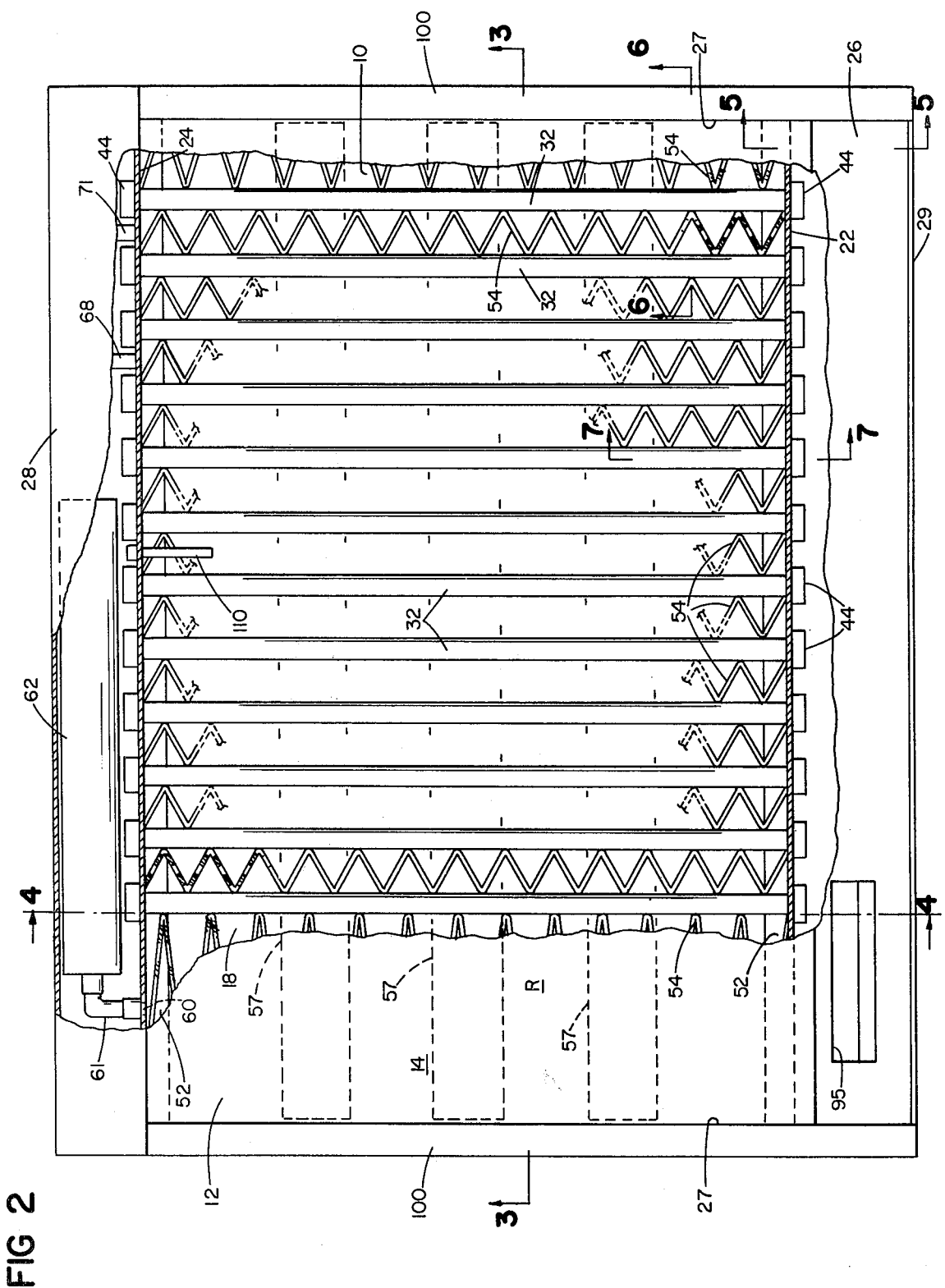
FIG. 2 is a plan view of said most preferred embodiment, also with a portion of the griddle surface broken away.
Figure 7:
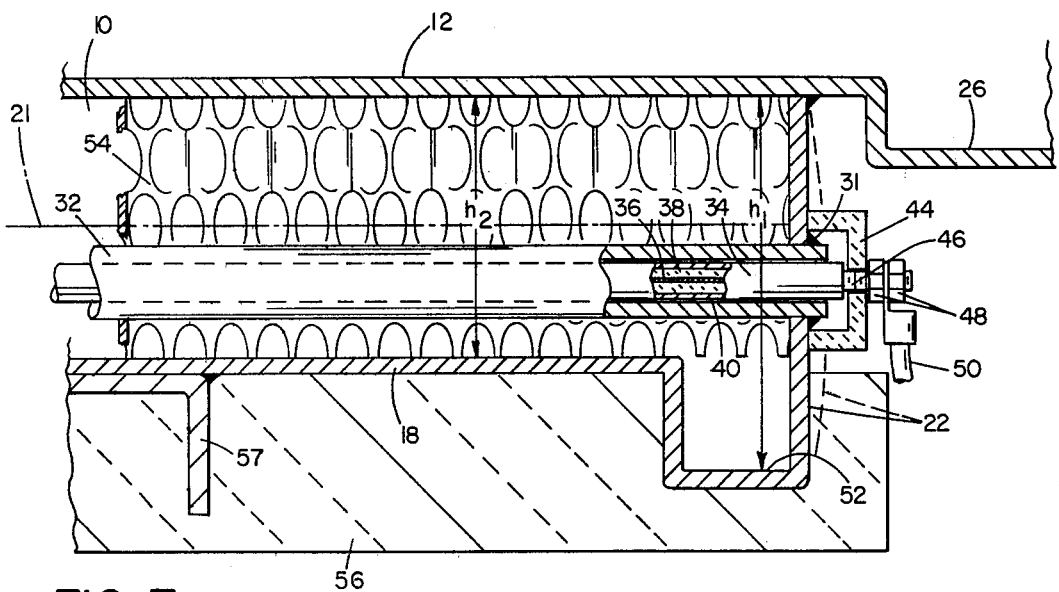
FIG. 7 is an enlarged cross-sectional view at 7—7 of FIG. 2, showing an electrical heating element.

Passing through chamber 10 from front to back are twelve hollow tubes 32 (FIG. 2) through which electrical heating elements 34 extend (FIG. 7). Tubes 32 ($\frac{1}{2}$ inch O.D.) extend through holes punched in front and back sides 22 at about 1.5 inches below panel 12 and are welded at 31 (FIG. 7) to the outside of front and back sides 22. Heat transfer liquid 21 fills chamber 10 to about $\frac{1}{4}$ inch above tubes 32, to level 21. Heating elements 34 extending through these tubes include resistance wire 36, insulation 38, and outer steel sheath 40. The clearance between each sheath 40 and tube 32 is the minimum obtainable with commonly-available components, and ranges from about 7 to 57 mils, with the nominal being 27 mils. Ceramic bushing 44, threaded piece 46 and nuts 48 secure the exposed ends of each heating element 24 and provide attachment points for wire terminals 50. Each element provides a heated length of about 23 inches and transfers about 1000 watts through about 36 in$^2$ of tube surface area, with a resultant watt density of about 28 watts/in$^2$ through the tube. The aggregate heat conducting area of the tubes is about 430 in$^2$ compared to the griddle surface of about 780 in$^2$.

To accomodate thermal elongation of tubes 32 and elements 34, sides 22 are given greater height $h_1$ (3 inches) than the chamber height $h_2$ (2 inches) by forming integral troughs 52 along the front and back edges of bottom panel 18.

Figure 6:
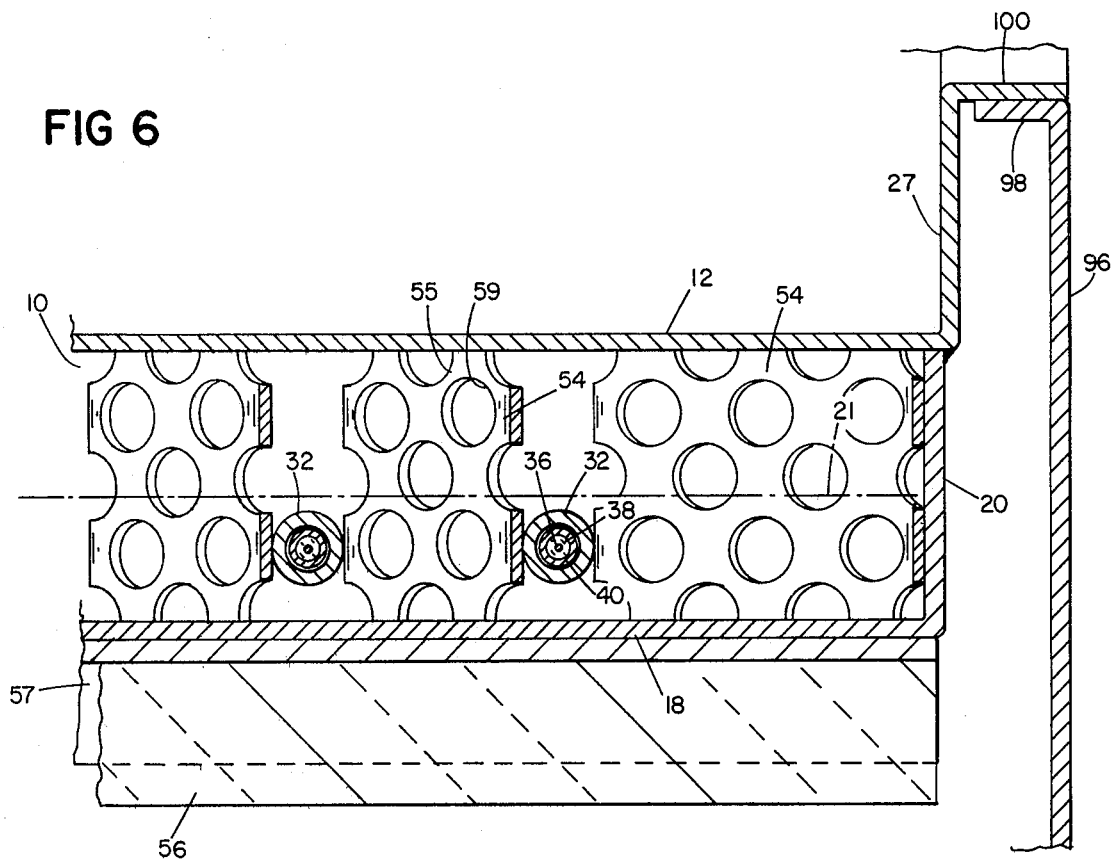
FIG. 6 is an enlarged cross-sectional view at 6—6 of FIG. 2, showing one side of the sealed chamber.

Within sealed chamber 10 there are provided support members 54 which snap into place between hollow tubes 32 to run from front to back of the unit. The members are serpentine-shaped (or zigzag folded) in the horizontal direction (FIG. 2) and straight in the vertical (or upright) direction. Their horizontal edges engage the griddle panel 12 and the bottom panel 18, at top and bottom to provide a support pattern. Similarly, wider support members 54a, 54b are provided at the left and right sides of the chamber, between side walls 20 and the heater tubes. Chamber 10 is evacuated so that members 54, 54a, 54b are always under compression. Members 54, 54a, 54b are cut from perforated sheet material to provide perforations 59 (FIG. 6) to allow passage of vapors. The staggered centers of the perforations assure that there are perforations 55 at the underside of the griddle to allow free passage throughout the chamber of noncondensible vapors which collect at the top of the chamber. Perforations in the lower part of the stiffeners ensures self-leveling flow of the heat transfer liquid. The pitch of the convolutions or folds in members 54, 54a, 54b is 2.5 inches, making the maximum unsupported distance on griddle panel 12 also about 2.5 inches.

On the underside of bottom panel 10 are welded three channel-shaped stiffeners 57 (FIGS. 2, 3, and 4), which extend in the long dimension of the unit. The stiffeners and the remainder of the bottom panel are undercoated with insulation 56 (KaoWool, slurry molded).

On the left side of chamber 10, a noncondensible gas collection region R (FIG. 2) is created by the absence of heating elements. Outlet 60 in back side 22, disposed immediately adjacent the under surface of griddle panel 12, and tube 61 ($\frac{1}{8}$ inch I.D.) connect this region with a smaller, uninsulated cylindrical chamber 62 (1 and $\frac{1}{2}$ inch I.D.; 18 in. long) mounted behind back panel 24. Outlet 60, tube 61, and chamber 62 form a means for isolating noncondensible gases. Value 64 (FIG. 3) provides a means of venting chamber 62.

Over pressure relief device 66 is mounted behind back panel 24 and communicates through tube 68 with the interior of chamber 10. Device 66 is set to open for chamber pressures above about 2 to 5 psi. The device consists of a 4 inch diameter thin metal disc normally-spaced from a cutting edge. A small positive pressure in the chamber forces the disc against the cutting edge, puncturing it and allowing vapors to escape.

Pressure switch 70 is mounted adjacent to relief device 66 and communicates through tube 71 with chamber 10. Switch 70 opens at a pressure corresponding to a chamber fluid temperature of 450° F. and interrupts current to heating elements 34. Manual reset button 72 on switch 70 must be depressed to restart the griddle.

About midway left to right in chamber 10 there is mounted on back side 22 a thermocouple 110 (FIG. 2) for measuring the temperature of fluid in the chamber. Cable 112 (FIG. 4) connects the thermocouple to electrical control box 11.

A thermostat (not shown) is mounted so as to sense the ambient temperature of the griddle and through the electrical controls prevent operation of the griddle when ambient temperatures are below 55° F.

Chamber 10 and its accessories are supported on base 6. The base has two U-shaped structural members 74 (FIG. 4) which support the front and back of chamber 10 at grease trough 26 and at brackets 30. Each of members 74 consists of vertical back section 76, horizontal lower section 78, and forward section 80, which has both vertical and horizontal sections. Lower sections 78 are welded to base panel 79. Adjustable foot pads 82 are threaded in nuts 84 fastened to front and back ends of lower section 78 of each structural member. The top ends of section 76 provide pivots for brackets 30. Electrical control box 111 rests on bottom panel 79. Cooling air A (FIG. 4) flows by convection from front to back through base 6, passing by and exiting just above isolation chamber 62. The air helps cool chamber 62 and control box 111.

Referring to FIGS. 3 and 4, grease drawer 190 is supported within tunnel-like enclosure 192. The drawer extends the full front to back depth of the griddle, is about 4 inches high and 6 inches wide, has internal baffles to reduce grease sloshing, and is removed from the front by grasping decorative front panel 94. Grease enters the drawer through chute 95 welded to trough 26.

Base 6 is enclosed by sides 96 (FIG. 3) with inwardly-bent top edges 98 located just below mating outwardly-bent top edges 100 of the chamber assembly. Front panel 102 is integral with sides 96 and has electrical control panel 103 next to grease drawer panel 94. Moveable skirt 104 surrounds the lower half of base 6. The skirt can be lifted for cleaning purposes, but is normally sealed to the counter top 105 with caulk bead 106.

The various sheet metal pieces are bent and welded together as above described, following conventional procedures. Chamber 10 is filled with about 3.5 gallons of Dowtherm A (Dow Chemical Corporation of Midland, Mich.), bringing the level of liquid 21 to ¼ inch above tubes 32 and leaving about 1 inch space between the liquid surface and the underside of griddle panel 12. After filling, the chamber is permanently evacuated such that the vapor pressure of the Dowtherm is 25 inches of mercury at 350° F., the cooking temperature.

To operate the griddle unit, it is first leveled using adjustable feet 82. Leveling is essential in order to assure that within chamber 10 the liquid evenly covers tubes 32 by about ¼ inch. Electrical power is then applied to elements 34 by pushing an ON button on control panel 103. The temperature of cooking surface 14 is controlled by a knob on the control panel.

Elements 34 heat the Dowtherm A liquid sufficiently to cause it to boil at the surface of tubes 34 and the heating vapors travel to cool regions of griddle panel 12 and transfer their heat by condensing on the panel, then drip back into the boiling liquid. The Dowtherm A liquid has a low vapor-pressure-to-temperature gradient as compared to water, thus enabling griddling temperatures to be achieved with relatively low pressures. Dowtherm A is a eutectic mixture containing 26.5% diphenyl and 73.5% diphenyl oxide by weight.

Proportional control circuitry is employed to control chamber temperature. When the output of thermocouple 100 indicates that the fluid temperature is within 7° to 8° of the set point temperature, the control electronics (Contranautics proportional controller CN100A) cause the power supplied to heating elements 34 to cycle on and off during six second long periods. The percentage of "on" time during each six second period diminishes as the temperature increases, being 100% for temperatures 7° or 8° below the desired level, and approaching 0% for temperatures about 8° above the desired level. This assures that the griddle surface temperature settles out at the set point temperature when the griddle is loaded with food. Thus a no-load the griddle surface can idle at a temperature slightly above the set point, depending upon ambient temperature and the amount of heat loss to ambient. Similarly under heavy load the griddle can settle out at a temperature a few degrees below set point. Magnetically actuated mercury contactors are used to switch power to elements 34. They prevent contact fusing and assure that power is shut off if the control electronics fail.

Referring to FIG. 7, the chamber construction provides compensation for thermal expansion of tubes 32, which expand slightly more than the sheet metal chamber during operation. The height $h_1$ of the sides 22 is made greater than the depth $h_2$ of the chamber by troughs 52. The greater height of sides 22 permits much greater flexing (as suggested by broken lines in FIG. 7) of the sides to accommodate the relatively greater thermal expansion of tubes 32. Undue stresses at the welds between the tubes and the sides are avoided, and the troughs require relatively little additional fluid.

During manufacture, known vacuum chamber processes are used to remove noncondensible gases from the interior of the chamber. After outgassing, the griddle is operated at 350° F. for an hour while being evacuated through valve 64. The chamber is then permanently sealed. Although subsequent operation of the griddle creates more noncondensibles, especially in the first week of operation, chamber 62 is designed large enough to contain them. Valve 64 is kept cool and isolated from the corrosive Dowtherm vapor by the noncondensible gases collecting in chamber 62 during operation, helping to assure that the valve maintains a tight seal.

Another Preferred Embodiment

Referring to FIGS. 14–19, griddle unit 110 has a top member 112 of 12 gauge steel sheet defining a horizontally extensive griddle surface, the top member 112 also forming the top wall of vapor chamber 114. Vapor chamber 114 has a limited dimension D and is horizontally extensive, corresponding generally to the extent of the griddle cooking surface, in this embodiment depth D=1½ inch, width W=26 inches, and length L=33 inches.

Figure 15:
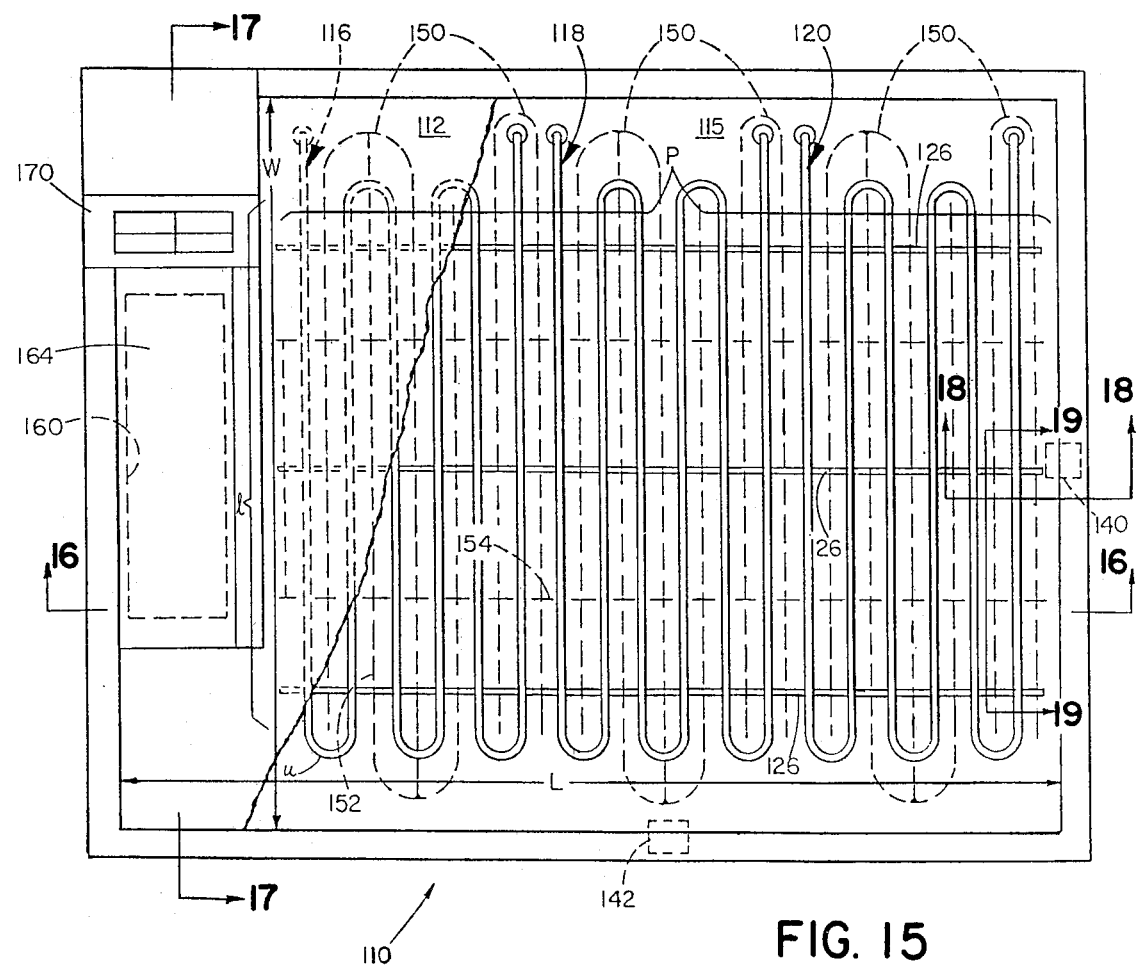
FIG. 15 is a plan view of the griddle unit of FIG. 14 showing the interfitting pattern of heater units and support structure therein.
Figure 18:
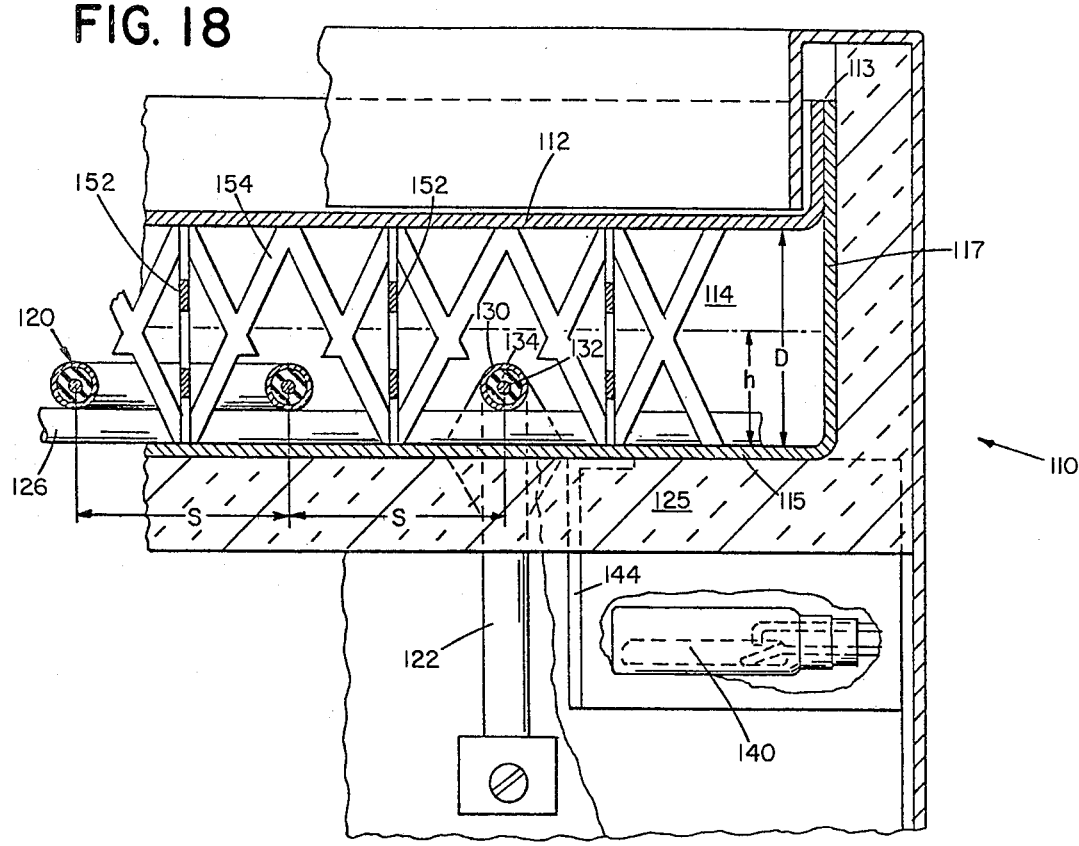
FIG. 18 is a longitudinal, and FIG. 19 a transverse, vertical cross-section of details of the vapor chamber of the invention taken on lines 18—18 and 19—19 of FIG. 15.
Figure 19:
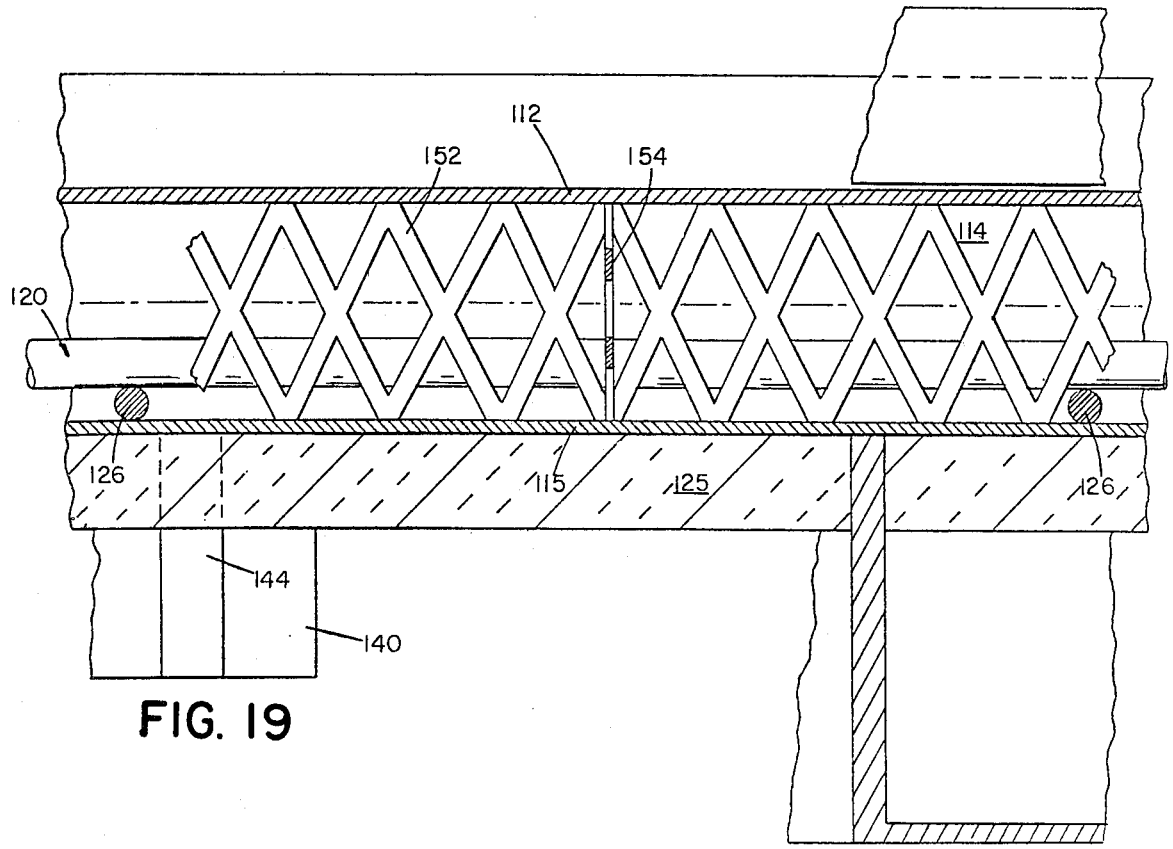

As shown in FIG. 15 the heater surface is defined by a pattern P of electrical tubular heaters, the pattern being substantially co-extensive with the griddle surface 112. As shown also in FIGS. 15 and 16 the pattern P is made up of three separate tubular elements 116, 118, and 120, each having a pair of terminal portions 122 extending through the bottom wall 115 of the vapor chamber and bottom insulation 125 to suitable electrical connections. As shown in FIG. 15 each tubular element 116, 118, 120, comprises a series of straight leg portions l joined at ends by U-shaped portions u in serpentine fashion. As shown in FIGS. 18 and 19 the heater tubes rest upon a spacer rod 126, thus being slightly elevated above the bottom 115 of the vapor chamber, and an operating liquid level h is established which completely immerses tubular elements 116, 118 and 120 in the liquid heat transfer medium. Referring to FIGS. 16 and 18, the spacing S between axes of the adjacent leg portions of the tubular elements in this preferred embodiment is 1½ inches, level h is 0.8 inches above the bottom 115 of the vapor chamber, the thickness of the spacer rod 126 is ⅛ inch and the diameter of the tubular heating element is 0.315 inches. As shown in FIG. 18, the tubular heater element is of conventional construction comprising an outer metal tube 130, electrical resistance core element 132 and insulation 134 between resistance element 132 and tubular member 130.

Tilt control of the griddle unit is provided by two tilt sensing switches 140 and 142, one arranged to sense tilt in the direction of length L and the other to sense tilt in the direction of width W, each being rigidly mounted by a bracket 144 in the same orientation as the vapor chamber 114, and each arranged to respond to a selected differential angle, for instance 8° tilt from the horizontal. A suitable tilt sensing switch for this application is switch No. 9-51 tilting type mercury contact switch manufactured by the Mercoid Corporation of Chicago, Ill. In the event either switch 142 or 144 is tilted beyond the design tilt value, energization of all heater units can be interrupted, this continuing until the unit is straightened back toward the horizontal to less than the selected tilt angle. In the event of tilt and especially because of the extensive arrangement of the heater elements and the shallow depth of the heat transfer fluid, it will be understood that liquid will flow to the lower end of the vapor chamber, depriving the tubular heaters of their cover of liquid heat transfer medium. If not de-energized the electric units would be heated to a much higher temperature than that of normal operation, due to the absence of the high heat absorbing capacity of the liquid. Then if the over-heated surface were contacted by heat transfer medium, either by drippage of condensate from the upper heating surface or by a surge back of the heat transfer liquid, the liquid would encounter temperatures above the design value, resulting in sudden evaporation and change of the vapor pressure in the unit with possible adverse consequences of overheating the cooking surface or over-pressuring the vapor chamber or overworking of the temperature controls. Also the possibility of degradation of the heat transfer medium either in vapor state or liquid state can exist, shortening the useful life of the griddle. These disadvantages are avoided by the tilt control just described. In the most preferred embodiment a vapor pressure sensitive switch performs the same function. Griddle surface 112 is maintained in planar condition, despite evacuation of vacuum chamber 114, by the presence of a supporting network 150. This supporting network comprises a series of planar expanded metal members 152 extending between adjacent parallel leg portions of the tubular heaters 116, 118 and 120. Legs 152 are joined at their ends by U-form portions in serpentine fashion. This pattern is mutually arrayed with serpentine arrangement of the tubular heaters, with straight leg portions l of tubular heaters alternating, in a spaced apart, mutually parallel relation to elongated leg portions 152. Furthermore, cross structural members 154 of expanded metal extend from one long leg 152 to the next, being welded to both, and thus completing a three dimensional supporting grid resting upon the bottom of the vapor chamber and extending to a supporting relation to the top member 112. Openings are formed in the expanded metal structure permitting ready flow of the heat transfer liquid to maintain the same level over all tubular heaters throughout the wide extent of the griddle.

Figure 14:
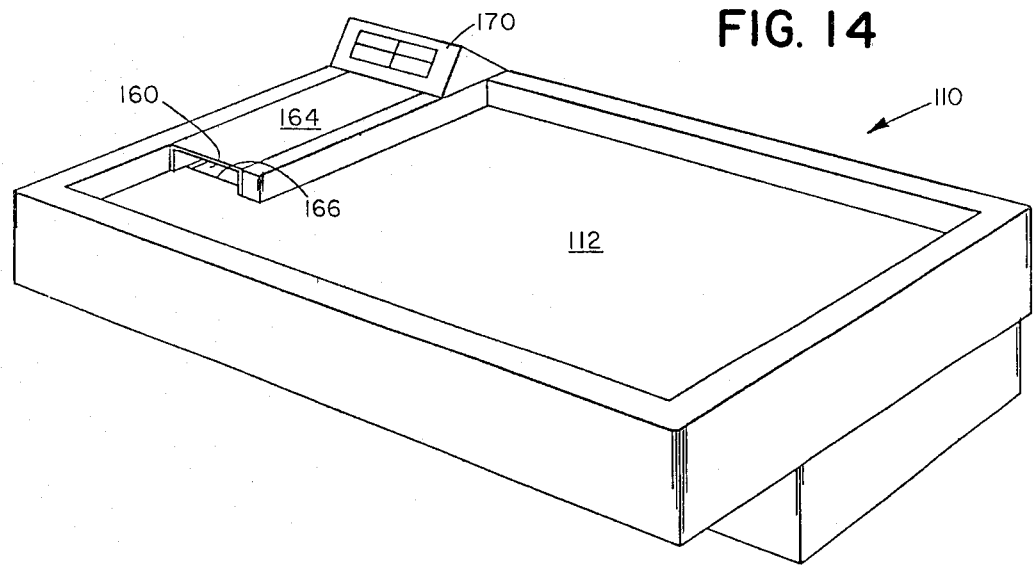
FIG. 14 is a perspective view of another preferred griddle unit according to the invention.

As will be seen in FIG. 14 the griddle surface 112 is rectangular but interrupted in one corner. This is for the purpose of providing a grease bucket 160 into which the user can scrape grease as indicated at 162 during use. A removable cover 164 is provided over the grease bucket and a sloped support 168 is provided causing the grease bucket when it is inserted to slide forwardly, thus to rest under the lip 166 formed by the wall of the vapor chamber in this region. Elsewhere around the vapor chamber the top wall 112 is turned upwardly to form flange 113 and the bottom wall 115 is turned upwardly to form side wall 117, the side wall overlapping and welded face to face with the flange 113, to seal the vapor chamber. In the grease trap region however the side wall 117a is turned outwardly horizontally, and a horizontal extension of the top wall 112 overlaps and is welded face to face with the extension forming the grease scraping edge of the griddle. The bucket handle is off-center to cause, when lifted, the bucket to rotate to clear the edge 166 during removal.

Also at the back of the unit is a control panel 170 providing four touch control buttons, "on," "off," "idle" and "cook". Beneath this control panel is an adjustment knob 172 for setting the cook temperature. The control of the heater elements is achieved through the use of vacuum sensing switches shown diagrammatically in FIG. 16. As is well known the vapor pressure and vapor temperature in a sealed unit such as this are related, increases in vapor pressure corresponding to an increase in vapor temperature and thus an increase in the temperature of the griddle surface 112. A reference cell 180 is provided having a predetermined pressure and a pressure differential switch 182, sensitive to the difference in pressure between the vapor chamber 114 and the reference cell 180 is provided, for regulating the temperature of the unit.

The spacing of the heater tubes above the surface of bottom member 115 of the vapor chamber insures free convection flow and release of bubbles of vapor formed on the underside of the resistance heater elements, thus avoiding a trapped condition which might exist if the elements rested upon the bottom directly. This again would have a detrimental overheating effect, because of portions of the heater surface would be contacted by vapor bubbles, not liquid, would become overheated, and would thus risk overheating of the heat transfer medium.

Other Embodiments

Other embodiments of the invention will occur to those skilled in the art. For example, raised sides 27 of griddle panel 12 (FIGS. 1, 12) could be replaced by downwardly sloping sides, to allow grease to be removed over the sides into side-mounted containers (the present grease trough, drawer and chute being removed). Grease could also be removed through a chute at the rear of the griddle. Other variations include forming chamber 62 from an integral extension of tube 61 when space and noncondensible gas volume permit.

Relationship To Other Applications

The embodiment of FIGS. 14–19 was the first unit constructed by us for public demonstration, a demonstration that occurred in 1975, subsequent to the filing of the parent patent application which contains these figures. The embodiment of FIGS. 1–13 has been constructed by our assignee, Peters and Company, following the broad teachings of our original application. FIGS. 1–13 also contain further features contributed by Benn, Svendsen and Borg. These features are the subject of further patent applications.

What is claimed is:

1. A vapor transfer griddle unit or the like comprising
   a planar sheet metal heat conductive top member defining a horizontally extensive griddle surface,
   a bottom wall sealed to the top member and defining therewith a corresponding vapor chamber disposed below said griddle top member,
   a body of vaporizable heat transfer medium in liquid state partially filling said chamber with a vapor space between the surface of said liquid and said top member at rest as well as over the range of griddling temperatures,
   a horizontally extensive electric heating array comprised of horizontally spaced elongated electric heater portions extending directly beneath and spaced below said top member and located above said bottom wall,
   and a set of griddle supports mutually arrayed with said heater portions and extending between and engaging said top member and said bottom wall to provide a pattern of support across the underside of said griddle top member to maintain the griddle surface flat over its range of operations, said supports having openings permitting free self-leveling flow of liquid as well as free flow of vapor in said chamber,
   said body of liquid fully immersing said array of heater portions throughout the range of griddling temperatures and comprising liquid which boils under vacuum conditions over said range,
   said chamber being permanently evacuated to a level sufficient to enable said liquid to so boil and
   said heater portions being heated by electrical resistance with associated controls to selectively heat said liquid to boil at any desired temperature in said range,
   whereby while the griddle is maintained flat for griddling, vapor can be rapidly generated to heat the griddles to any selected griddling temperature in an energy-efficient manner.

2. The griddle of claim 1 wherein there is an exterior heating surface of said portions which receives heat from said electrical resistance elements and transfers the heat to said liquid and wherein said heating surface comprises an aggregate heat transfer area greater than one half of the griddle cooking area.

3. The griddle of claim 1 or 2 wherein heat transfer from said heating surface of said portions to said liquid occurs at a watt density of the order of 30 watts per square inch of surface.

4. The vapor transfer griddle unit of claim 1 or 2 wherein said array of heater portions comprises a set of straight, parallel horizontally spaced apart portions, each extending in length substantially throughout one horizontal dimension of said cooking surface, and said set of griddle surface supports is interfitted in the spaces between said heater tube portions to provide said pattern of support coextensively with the extent of said array of heater portions.

5. The griddle unit of claim 4 wherein the spacing between the axes of adjacent heater portions is less than about five times the diameter of said heater portions.

6. The griddle unit of claim 1 wherein said chamber has a depth between about 1½ and 2 inches, and a width and length between two and three feet, about half of the depth of said chamber being filled with heat transfer liquid.

7. The griddle of claim 1 wherein said griddle supports comprise a plurality of first supports extending along a first direction of said chamber and a plurality of second supports extending along a second direction transverse to said first direction, thereby forming a support grid to maintain said planar top member flat for griddling.

* * * * *